Nov. 11, 1930.                W. S. BAYLIS                1,781,265
                PROCESS OF MAKING A DECOLORIZING CLAY
                        Filed May 14, 1929

Inventor:
WALTER S. BAYLIS,
BY

ATTORNEY.

Patented Nov. 11, 1930

1,781,265

UNITED STATES PATENT OFFICE

WALTER S. BAYLIS, OF LOS ANGELES, CALIFORNIA, ASSIGNOR TO FILTROL COMPANY OF CALIFORNIA, OF LOS ANGELES, CALIFORNIA, A CORPORATION OF CALIFORNIA

PROCESS OF MAKING A DECOLORIZING CLAY

Application filed May 14, 1929. Serial No. 363,049.

This invention relates to the activation of clays with mineral acids, such as diluted or concentrated sulfuric, hydrochloric, or nitric acids. This application is a continuation-in-part of my co-pending application, Serial No. 110,962, filed May 22, 1926. The invention herein described is intended to be an improvement on the process and product disclosed in U. S. Patent No. 1,492,184 to J. W. Weir and J. C. Black. In that patent colloidal clays of various kinds are treated with about ten percent. of their weight of concentrated sulfuric acid without washing out the reaction products of the acid and the clay, nor driving off the water of crystallization from the clay, nor eliminating the excess acid, if any. Theoretically, the acidity should be entirely neutralized in this product by the excess of clay in the mixture but, practically, several difficulties have been encountered with the product. At times shipments of the clay have eaten holes in the cloth or paper bags in which the material was shipped and the high free acidity has had a bad effect upon the hands and shoes of workmen handling the product.

In the present process, colloidal clays of the hydrous aluminum silicate, hydrous magnesium aluminum silicate and/or hydrous calcium magnesium aluminum silicate types (of which smectite, including bentonite, montmorillonite, fuller's earth and the like, are typical) are treated by adding to them from 25% to 50% by weight of any of the acids above mentioned, but preferably sulfuric acid; the clay and acids are then thoroughly mixed and then from three to five times the weight of raw clay is added to the mixture as was used in the original batch which was acid treated. The underlying thought of this procedure is to first uniformly distribute the treating acid in a small batch of clay and then add sufficient raw clay to substantially neutralize the excess of acid. The treated clay and the raw clay are to be well mixed so that a substantially uniform distribution of acid occurs. The mixed mass is then allowed to react for a suitable length of time, say from one hour to twenty-four hours, so as to get the full benefit of the strength of the acid, and the excess acid, if any, separated. The mixture is then heated in a cylindrical kiln for a time and to a temperature sufficient to drive off the excess of acid, as the acid anhydride. This temperature is intended to be only sufficient to volatilize the remaining excess acid but not sufficient to sinter or glaze the clay particles. If hydrochloric or nitric acids are used, the temperature may be sufficient to partly or wholly decompose some of the nitrates or chlorides present, but their complete decomposition or volatilization is not necessary. The temperature should be sufficiently high to drive off a substantial quantity, preferably the major part of the water of crystallization in the clay. I have found that such water-free clay gives better results upon certain oils than can be had from a product, such as that of Weir and Black, which still retains it.

Specifically, I may use an acid ranging from 15% to 35% in strength in a proportion of from 25% to 50% by weight upon an initial batch of clay, which shall be from 20% to 33% of the total weight of the entire clay batch. The acid-treated clay batch may then be dehydrated and de-acidified at temperatures ranging from 300° F. to 750° F., the temperature being held as low as possible to accomplish the desired result upon the specific clay and acid combination used.

A suitable procedure and apparatus for carrying out my process is shown in the accompanying drawing, in which there is provided a solution tank 1, an agitator 2, a filter press 3, a dry mixer 4 and a dehydrator 5.

The solution tank 1 consists of a shell 11 having a conical bottom 12 to which a pipe 13 is connected, this pipe 13 having a valve 14 and extending to the agitator 2. Concentrated sulfuric acid may be supplied to the solution tank 1 through a pipe 16 and water may be supplied to the solution tank 1 through a pipe 17. The sulfuric acid and water are mixed in the solution tank 1 and it is desired to have a 15% to 35% solution of sulfuric acid.

The agitator 2 consists of a shell 21, providing an agitating chamber 22. Extending into the agitating chamber 22 is a shaft 23 on which agitating paddles 24 are carried. The shaft 23 is rotated by beveled gears 25. The solution of sulfuric acid is introduced into the agitating chamber 22 through the pipe 13 when the valve 14 is open. Raw clay is introduced into the chamber 23 through a spout 26. Sulfuric acid and raw clay are thoroughly mixed in the agitating chamber 22, it being desirable to have a mixture of acid and raw clay which contains from 25% to 50% by weight of sulfuric acid, due allowance being made for any water initially in the clay. The acid and clay react on each other during the time that they are mixed, and it is found that this reaction is highly promoted, most likely since a large quantity of sulfuric acid is mixed with a comparatively small quantity of raw clay. The raw clay when it has been thoroughly acted upon by the sulfuric acid forms what I term "treated clay."

Extending from the bottom of the shell 21 is a pipe 28 having a valve 29 and a pump 31 therein. This pipe 28 extends to the filter press 3. The pipe 28 is joined to a shell 32 of the filter press 3 and is in communication with a filter chamber 33 which is provided by the shell 32. In the chamber 33 is a plurality of filter bags 34, made preferably of wool or asbestos, the interior of which have pipes 35 connected therewith. These pipes 35 connect with a header 38 having a vacuum pump 37 therein. After the clay and sulfuric acid are thoroughly mixed, the valve 29 in the pipe 28 is opened and the pump 31 is set into operation so that the mixture will be forced to the filter press 3. The filter bags 34 are fabricated so that only the liquid of the mixture may pass therethrough and through the pipe 35 into the header 36. Therefore, the acid treated clay will collect in cakes 38 on the bags 34. The vacuum pump 37 may be set into operation at the same time that the pump 31 is set into operation. After all the mixture has been pumped through the filter press 3 the vacuum pump will effectively draw most of the free liquid from the cakes of treated clay 38, leaving them nearly dry.

The treated clay is then removed from the filter press 3 and dumped into a hopper 41. The treated clay is delivered from the hopper 41 to the dry mixer 4 by means of a conveyor 42.

The dry mixer 4 consists of a shell 43 providing a mixing chamber 44. Paddles 45 are secured on a shaft 46 in the chamber 44, this shaft being driven by bevel gears 47. Raw clay is introduced into the mixing chamber 44 through a spout 48. The treated clay and the raw clay are very thoroughly mixed in the mixing chamber 44 by action of the rotating paddles 45. I prefer to mix substantially one part of treated clay with four parts of raw clay. After the mixing action has taken place long enough to very thoroughly mix the treated clay and the raw clay, the mixing action is arrested and the mixture is passed to the dehydrator 5.

The bottom of the shell 43 of the dry mixer 4 is connected to the conveyor 49 through a valve 51. The valve 51 is opened and the conveyor 49 is set into operation, thus taking the mixture from the mixer 4 and delivering it to the dehydrator 5. The dehydrator 5 is shown as being a kiln and consists of a drum 53 which is rotatably supported on rollers 54 and which is rotated by a gear 56 which meshes with a gear 57 of the drum 53. The interior of the drum 53 is very highly heated and the mixture is passed therethrough from the left end to the right end thereof. In the dehydrator the mixture is heated in order to drive off unreacted acid, as anhydride, and to drive off the water of crystallization. The mixture passes from the dehydrator 5, through a conduit 59, in the form of decolorizing clay of substantially neutral or perhaps feebly acid reaction.

It should be clearly understood that in the drawing I diagrammatically illustrate apparatus for conducting my process to produce the decolorizing clay of my invention, and it should also be understood that other apparatus for accomplishing the same results might be used. For example, different forms of agitators and mixers might be used and different forms of apparatus for drying the treated clay and for dehydrating the mixture of treated clay and raw clay might be used. For instance, in place of the filter press 3 the liquid might be separated from the treated clay by decantation.

The decolorizing clay of my invention is of high quality and is a very efficient decolorizing agent for oils. Also, the decolorizing clay of my invention is very cheaply produced.

As a modification of the above described method, I may mix untreated clay with the first batch of acid-containing clay without first separating excess acid from the first batch with a filter press or otherwise. The excess acid may then be driven off by heat as before.

I claim as my invention:

1. The process which comprises treating an initial batch of an activatable colloidal clay with a highly ionized mineral acid; adding a greater quantity of raw activatable clay; and subjecting the mixture to a temperature sufficient to eliminate substantially all water of crystallization and free acid from the clay.

2. A process according to claim 1 in which the clay is of the activatable bentonite type and in which the acid is sulfuric acid.

3. The process which comprises: treating an initial batch of an activatable colloidal clay with a highly ionized mineral acid of from 15% to 35% strength; then adding a substantial quantity of untreated clay of the same kind, allowing the reaction to become substantially complete; and then substantially eliminating water of crystallization and free acid from the mixture.

4. A process according to claim 3 in which the adsorbent is derived from a clay of the activatable bentonite type and the acid is sulfuric acid.

5. The process which comprises: treating an initial batch of an activatable colloidal clay with a highly ionized mineral acid of from 15% to 35% strength; then adding raw clay of the same kind in quantity from three to five times the weight of the initial batch; allowing time for the reaction between acid and clay to become substantially complete; and then substantially eliminating free acid and water of crystallization from the mixture by heating to a temperature between 300° F. and 750° F.

6. A process according to claim 5 in which the acid is sulfuric acid and the clay is of the activatable bentonite type.

7. A process according to claim 5 in which the weight of acid added to the first clay batch ranges from 25% to 50% of said clay batch.

8. An activated adsorbent clay retaining substantial quantities of the salts formed during the activating treatment, but being devoid of substantial free acidity and water of crystallization.

9. An adsorbent of the kind described in claim 8 in which the clay from which the adsorbent is made is derived from an activatable bentonite.

In testimony whereof, I have hereunto set my hand at New York, New York, this 13th day of May, 1929.

WALTER S. BAYLIS.